United States Patent [19]

Yasuo

[11] Patent Number: 5,243,717
[45] Date of Patent: Sep. 14, 1993

[54] HUMAN BODY SENSING MECHANISM FOR AN AUTOMATIC FAUCET APPARATUS

[75] Inventor: Takashi Yasuo, Tokoname, Japan

[73] Assignee: Inax Corporation, Aichi, Japan

[21] Appl. No.: 927,732

[22] Filed: Aug. 12, 1992

Related U.S. Application Data

[63] Continuation of Ser. No. 669,935, Mar. 15, 1991, abandoned.

[30] Foreign Application Priority Data

Mar. 16, 1990 [JP] Japan .................. 2-27509[U]

[51] Int. Cl.$^5$ ............................................. E03C 1/05
[52] U.S. Cl. ........................................ 4/623; 251/129; 251/04
[58] Field of Search ................... 4/23; 251/129.04

[56] References Cited

U.S. PATENT DOCUMENTS

| 3,337,992 | 8/1967 | Tolson | 340/539 X |
| 3,556,146 | 1/1971 | Groen | 4/623 |
| 4,141,091 | 2/1979 | Pulvari | 4/313 |
| 4,520,516 | 6/1985 | Parsons | 4/623 |
| 4,553,277 | 11/1985 | Duncan | 4/643 |
| 4,688,277 | 8/1987 | Kokinoki et al. | 4/623 |
| 4,722,102 | 2/1988 | Neugart et al. | 4/192 |
| 4,788,998 | 12/1988 | Pepper et al. | 251/129.04 |
| 4,790,514 | 12/1988 | Marks | 251/129.04 |
| 4,838,310 | 6/1989 | Scott et al. | 251/129.04 |
| 4,886,207 | 12/1989 | Lee et al. | 251/129.04 |
| 4,894,874 | 1/1990 | Wilson | 4/623 |

FOREIGN PATENT DOCUMENTS

| 58-28076 | 2/1983 | Japan | 4/623 |
| 140337 | 5/1990 | Japan | 4/623 |
| 0646765 | 12/1984 | Switzerland | 4/623 |

Primary Examiner—Henry J. Recla
Assistant Examiner—Robert M. Fetsuga
Attorney, Agent, or Firm—Birch, Stewart, Kolasch & Birch

[57] ABSTRACT

A human body sensing mechanism for an automatic faucet apparatus which is so constructed that in the vicinity of a water outlet at an automatic faucet is provided a body of human body sensor for detecting a human body, a water discharge device for controlling opening and closing of a valve provided on the way of a water passage is provided at the position apart from the water outlet, at the body of human body sensor is provided a transmitting part for out-putting a human body detection signal by a radio system, and at the water discharge control device is provided a receiving part for receiving the human detection signal transmitted by the radio system.

2 Claims, 3 Drawing Sheets

5,243,717

HUMAN BODY SENSING MECHANISM FOR AN AUTOMATIC FAUCET APPARATUS

This application is a continuation, of application Ser. No. 07/669,935 filed on Mar. 15, 1991, now abandoned.

FIELD OF THE INVENTION

The present invention relates to an improvement in a human body sensor provided at an automatic faucet apparatus which detects the existence of a human body to automatically control water discharge.

PRIOR ART

Conventionally, the art regarding an automatic faucet apparatus has been well known as disclosed in, for example, the U.S. Pat. No. 4,688,277.

FIG. 3 is a structural view of a conventional automatic faucet 11, which is so constructed that a human body sensor 15 is mounted at a water outlet 14 of a faucet body 12, and a water discharge control device 16 is housed within the faucet body 12 and connected through a signal conductor 17 to an electromagnetic valve 19 provided on the way of a water supply pipe 18, so that the water discharge control device 16 receives through a signal conductor 13 a human body detection signal output from the human body sensor 15, thereby generating an operating signal to the electromagnetic valve 19.

The human body sensor 15 normally uses a device of diffuse reflection type utilizing an infrared ray. In other words, the human body sensor 15 is provided with an infrared ray emitting part and a receiving part for the reflected light, so that when a user extends his hands near the water outlet 14, the infrared ray emitted from the light emitting part is reflected and the reflected light is detected by the light receiving part, thereby outputting a human body detection signal. The water discharge control device 16 opens the electromagnet valve 19 on the basis of the human body detection signal, and discharges water from the water outlet 14 at the faucet body 12 through a water supply pipe 18 for a predetermined time or while receiving the human body detection signal.

The conventional automatic faucet apparatus 11 wiring-connects the human body sensor 15 and the water discharge control device 16, whereby it is required that both the parts must be subjected to waterproof processing, thereby having the defect that a manufacturing process is complicated. Because of the wiring connection the human body sensor 15 is confined in its mounting position to the water outlet 14. In the human body sensor 15 a light source for emitting the infrared ray, a detecting circuit of the received reflected light, and an output device for the human body detection signal are built in, thereby creating the problem in that not only the human body sensor 15 itself is large-sized and gives a poor appearance, but also space around the water outlet 14 is restricted. When the water outlet 14 is restricted therearound, various drawbacks are created in that the user not only is hindered from rinsing his fingers but also contacts with the human body sensor 15 to thereby raise the possibility of breaking the sensor 15.

SUMMARY OF THE INVENTION

The present invention is a human body sensor of radio system designed to solve the aforesaid conventional problem, and characterized in that a human body sensor body is provided in the vicinity of a water outlet of an automatic faucet, a water discharge control device for controlling open and close of a valve provided on the way of a water passage and apart from the water outlet, at the human body sensor body is provided a transmitting part for outputting a human body detection signal in a radio system, and a receiving part for receiving the human body detection signal transmitted in the radio system is provided at the control device.

DESCRIPTION OF THE PREFERRED EMBODIMENT

Next, explanation will be given on an embodiment of the present invention on reference to the drawings.

Figure 1:
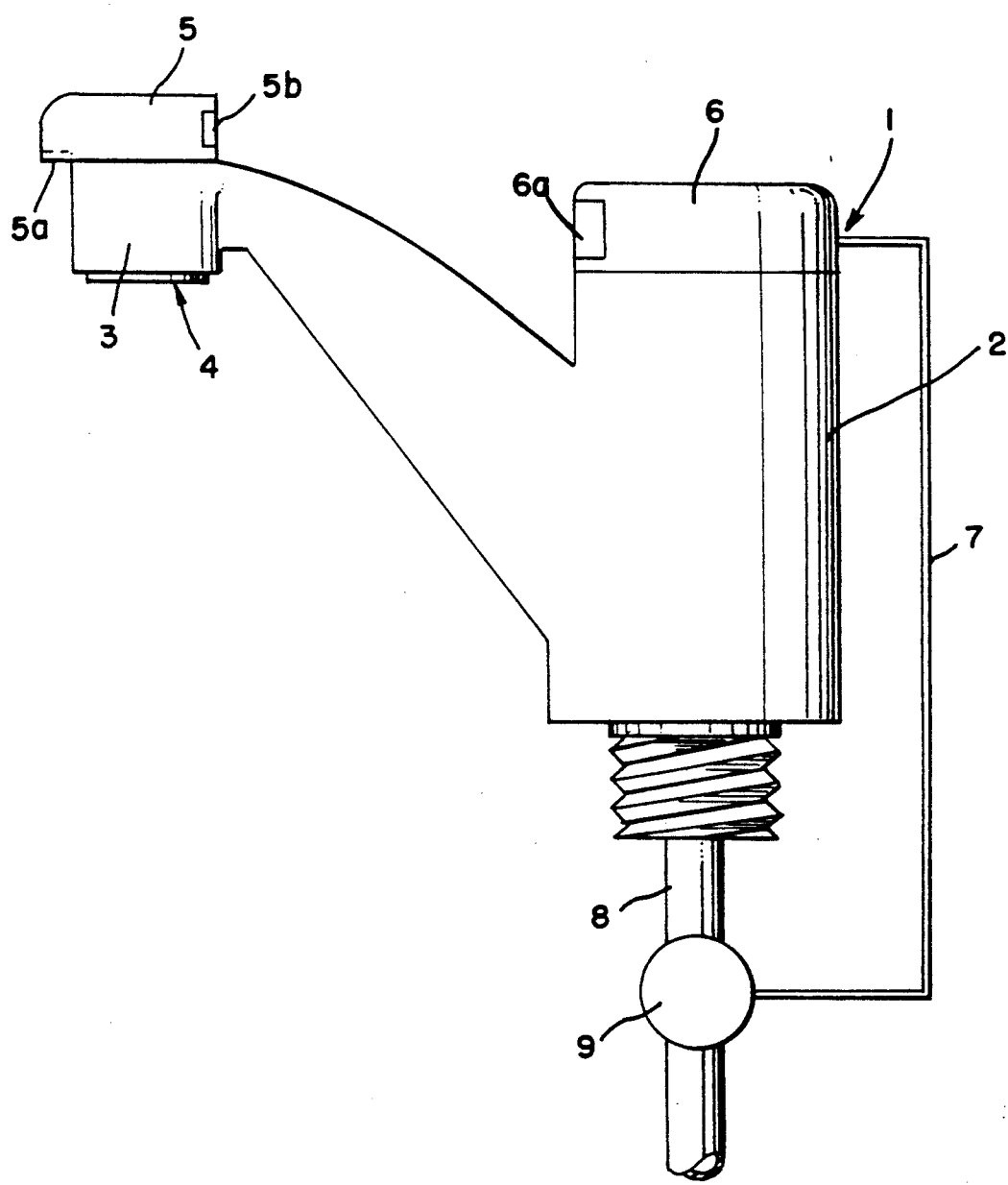
FIG. 1 is a side view of an automatic faucet apparatus provided with a radio system human body sensor of the present invention.

FIG. 1 shows an automatic faucet apparatus 1 provided with a human body sensor of the present invention, construction of which is outlined as follows:

A human body sensor body 5 is mounted on the upper surface of a water outlet 3 at the automatic faucet apparatus 1, and a water discharge control device 6 is provided at the upper portion of the faucet body 2 and connected through a signal conductor 7 to an electromagnetic valve 9 provided on the way of a water supply pipe 8. The human body sensor body 5 is provided with a transmitting part 5b for outputting a human body detection signal by radio waves, the infrared ray, or ultrasonic waves, as well as a light emitting and light receiving part 5 for, for example, the infrared ray, for detecting the human body.

The light emitting and receiving part 5 need only be disposed at the position where the user's hand or the like extending toward a water outlet 4 is detectable, so that it is preferable that the human body sensor body 5 is mounted at the upper surface of water discharge part 3 reverse to the water outlet 4 side of hindering the use of water. On the contrary, the water discharge control device 6 is required to be disposed at a position where a receiving part 6a is receivable of the human body detection signal output in the above-mentioned radio system. Therefore, it is preferable to dispose the water discharge control device 6 on the upper portion of faucet body 2, which is properly changeable by configuration or the like of the faucet body 2. In addition, the water discharge control device 6, as the same as the conventional apparatus, gives a command of opening the electromagnetic valve 9 through the signal conductor 7 on the basis of the human body detection signal, thereby starting water discharge.

The embodiment, which transmits by the radio system the signal between the human body sensor body 5 and the water discharge control device 6, requires no wiring therebetween. The conventional automatic faucet apparatus houses in the faucet body the water discharge device which is wiring-connected with the human body sensor, whereby it is impossible to construct the automatic faucet by utilizing the existing faucet. However, the automatic faucet apparatus of the present invention need not include troublesome wiring work, so that the human body sensor body 5 and water discharge control device 6 are mounted even on the existing not-automatic faucet and the electromatnetic valve 9 and water discharge control device 6 provided at the proper position of water supply pipe 8 are connected by the signal conductor 7 or the like, thereby enabling the automatic faucet apparatus 1 to be constructed with ease. Namely, the automatic faucet apparatus 1 of the present invention is advantageous in that the existing faucet is utilizable.

Figure 2:
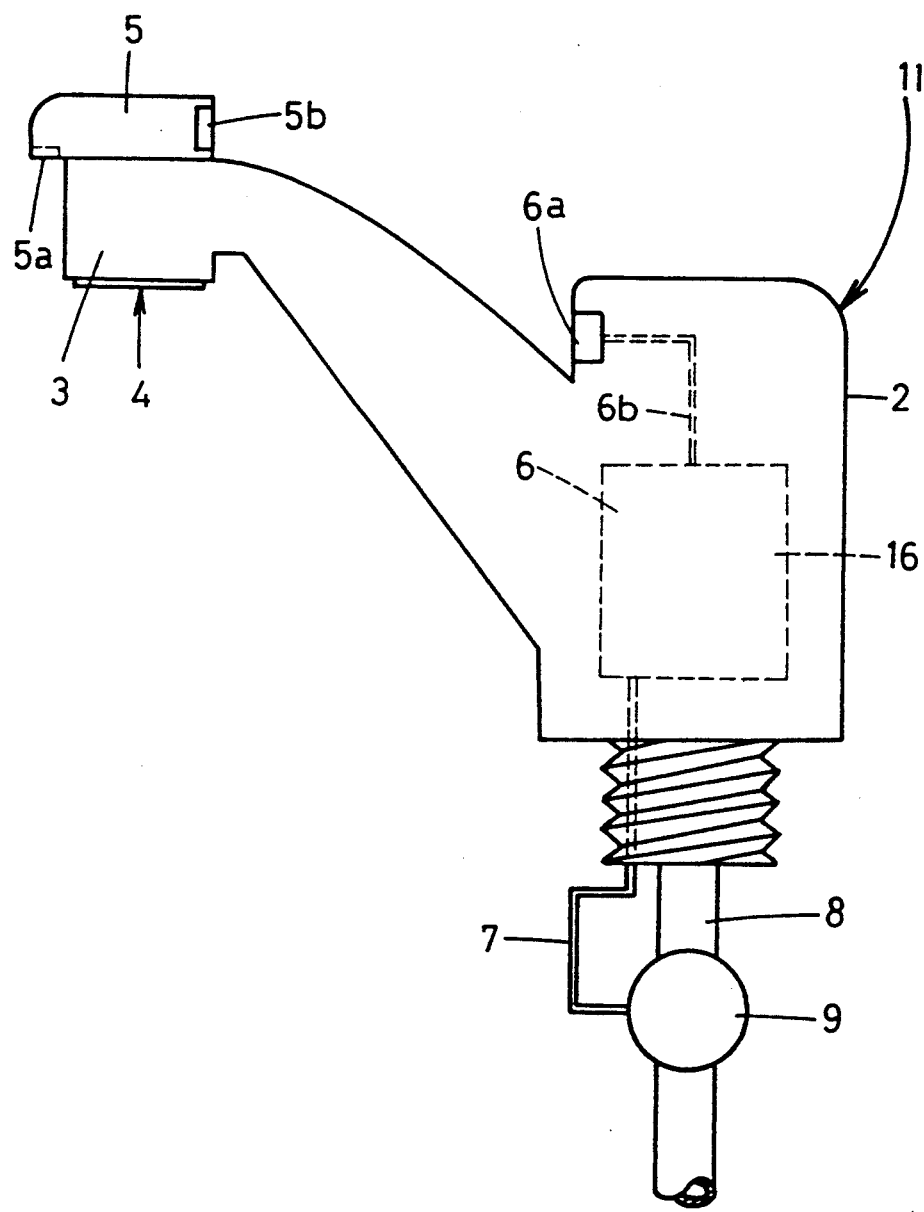
FIG. 2 is a side view of a modified embodiment of an automatic faucet apparatus of the present invention.
Figure 3:
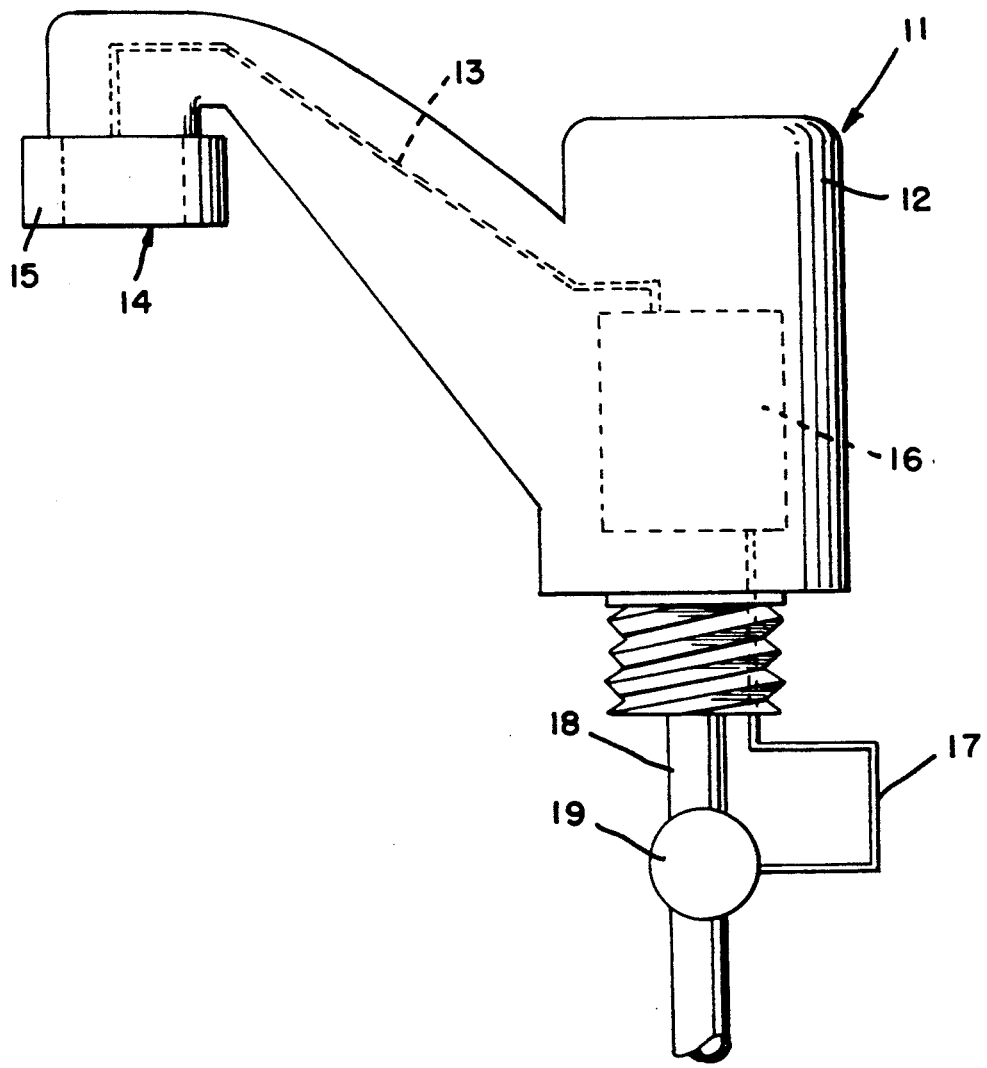
FIG. 3 is a side view of the conventional automatic faucet apparatus.

FIG. 2 shows a modified embodiment of the present invention. Although the former embodiment mounts the water discharge control device 6 outside the faucet body, the modified embodiment adopts construction such that a water discharge control device 6 is housed within the faucet body 2. In this case, a receiving part 6a for the human body detection signal output by the radio system from a transmitting part 5b at the human body sensor body 5 is provided at a proper location of the faucet body 2 and the receiving part 6a and water discharge control device 6 are connected by a signal conductor 6b or the like. Other components are in common with those in FIG. 1.

In this embodiment, the water discharge control device 6, which is housed in the faucet body 2, requires no wiring to the human body sensor body 5, thereby simplifying the construction of automatic faucet apparatus 1 more than the conventional one, thereby improving the manufacturing efficiency.

The water discharge control device 6, other than the above-mentioned, may be positioned below a wash counter at which the faucet body 2 is installed. The water discharge control device 6 is made separate from the faucet body 2, whereby the faucet body 2 can be simple in configuration. Human body detection means at the human body sensor body 5, other than using the infrared ray, may adopt utilization of ultrasonic waves. Thus, the present invention does not hinder various modification corresponding to the embodiments.

Operation of the Invention

By the above-mentioned construction, in the human body sensor of the present invention, the human body sensor body provided in the vicinity of the water outlet, when detecting a human body, outputs the human body detection signal from the transmitting part by the radio system and transmits the signal to the receiving part at the water discharge control device provided separately from the water outlet. Hence, the water discharge control device gives to the electromagnetic valve provided on the way of passage the command to open the valve, thereby discharging water for the predetermined or desired time period. In addition, the above-mentioned radio system specifies transmission means using radio waves, electromagnetic waves of the infrared ray, or ultrasonic waves.

Effect of the Invention

As seen from the above, the human body sensor of the present invention transmits the human body detection signal from the sensor body to the control device by the radio system, whereby the wiring connection between the sensor body and the control device is not required. Accordingly, since constraint in the disposed position of both the members is reduced, not only manufacture of the automatic faucet apparatus is facilitated, but also the existing faucet can be utilized to construct the automatic faucet apparatus.

Conventionally, since wiring connection has been required between the human body sensor body and the control device, a strict waterproof processing must be applied. On the contrary, the present invention need not execute the waterproof processing and wiring work, thereby saving labor during manufacturing.

Furthermore, the absence of a need for wiring connection raises the degree of freedom of the mounting position of the human body sensor body, thus it is possible to mount the body at a location which does not hinder the use thereof and to widen the space around the water outlet, in other words, convenience use is improved to that extent.

Thus, the present invention demonstrates a great increase in practicability.

What is claimed is:

1. A human body sensing mechanism for an automatic faucet apparatus comprising
   faucet body,
   a water passage extending upwardly and outwardly from said faucet body at an angle to said faucet body and having an end portion disposed higher than said faucet body,
   a water discharge part disposed at said end portion of said water passage,
   human body sensor means located above and supported by said water discharge part for securing the presence of a human,
   a transmitting means disposed in a portion of said human body sensor means facing toward said faucet body for transmitting a signal when the human is sensed,
   a water discharge control device disposed above and supported by said faucet body for actuating a valve disposed between a water source and said water passage,
   a receiving means disposed in a portion of said water discharge control device and facing toward said transmitting means for receiving the transmitted signal to actuate the valve, and
   said transmitting means being disposed in a higher position than said receiving means.

2. A human body sensing mechanism for an automatic faucet apparatus as set forth in claim 1 wherein said transmitting means transmits the signal in radio waves upon the detection of the human.

* * * * *